US006597928B2

(12) United States Patent
Ito

(10) Patent No.: US 6,597,928 B2
(45) Date of Patent: Jul. 22, 2003

(54) PORTABLE TELEPHONE MARACA WHICH PRODUCES MUSICAL TONES IN SYNCHRONIZATION OF THE SWINGS AND VIBRATION OF THE USER

(75) Inventor: Shuhei Ito, Toyohashi (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/181,637

(22) PCT Filed: Jan. 25, 2001

(86) PCT No.: PCT/JP01/00477

§ 371 (c)(1), (2), (4) Date: Jul. 19, 2002

(87) PCT Pub. No.: WO01/54780

PCT Pub. Date: Aug. 2, 2001

(65) Prior Publication Data

US 2003/0003967 A1 Jan. 2, 2003

(30) Foreign Application Priority Data

Jan. 25, 2000 (JP) ........................................ 2000-16335

(51) Int. Cl.[7] ............................ H04B 1/38; H04M 1/00; G08B 5/22; H04Q 7/00; H04Q 5/22

(52) U.S. Cl. ....................... 455/567; 340/7.39; 340/7.6; 340/407.1; 310/81

(58) Field of Search ......................... 455/567; 340/7.39, 340/7.6, 407.1; 310/81

(56) References Cited

U.S. PATENT DOCUMENTS

| | | | | | |
|---|---|---|---|---|---|
| 6,125,264 | A | * | 9/2000 | Watanabe et al. | 340/7.39 |
| 6,281,785 | B1 | * | 8/2001 | Hamaguchi | 340/407.1 |
| 6,404,085 | B2 | * | 6/2002 | Hamaguchi et al. | 310/81 |
| 6,411,198 | B1 | * | 6/2002 | Hirai et al. | 340/7.6 |
| 6,418,330 | B1 | * | 7/2002 | Lee | 455/567 |

FOREIGN PATENT DOCUMENTS

| | | |
|---|---|---|
| JP | 10-253776 | 9/1998 |
| JP | 11-290552 | 10/1999 |
| JP | 11-347257 | 12/1999 |
| JP | 2000-5441 | 1/2000 |
| JP | 2000-70552 | 3/2000 |

* cited by examiner

*Primary Examiner*—William Cumming
(74) *Attorney, Agent, or Firm*—Pillsbury Winthrop LLP

(57) ABSTRACT

A portable telephone is designed to realize portable telephone functions and game device functions, particularly music games, which are embodied by a vibration device such as a vibration sensor and a vibration motor. When the user swings and vibrates the portable telephone like a maraca in synchronization with the rhythm of a prescribed musical tune, the vibration device produces vibration pulses, which are compared with rhythm pulses. Then, a score is marked on user's operation to swing the portable telephone on the basis of time differences detected between the vibration pulses and rhythm pulses and is displayed on the screen of a display.

5 Claims, 2 Drawing Sheets

K
CPU
1
ROM
2
RAM
3
OPERATOR INPUT
4
DISPLAY
5
COMMUNICATOR
6
7
SPEECH PROCESSOR
8
9
10
MUSICAL TONE MEMORY
13
CONTROLLER
14
SOUND SOURCE CIRCUIT
15
RHYTHM SOUND SOURCE
16
DAC
18
DAC
19
20
21
VIBRATION SENSOR
23
VIBRATION DETECTION CIRCUIT
24
RHYTHM DIFFERENCE DETECTION CIRCUIT
25

K1
CPU
ROM
RAM
OPERATOR INPUT
DISPLAY
COMMUNICATOR
SPEECH PROCESSOR
MUSICAL TONE MEMORY
CONTROLLER
RHYTHM DIFFERENCE DETECTION CIRCUIT
VIBRATION MOTOR
SOUND SOURCE CIRCUIT
RHYTHM SOUND SOURCE
POWER SOURCE CIRCUIT
DAC
DAC

PORTABLE TELEPHONE MARACA WHICH PRODUCES MUSICAL TONES IN SYNCHRONIZATION OF THE SWINGS AND VIBRATION OF THE USER

This application is the National Phase of International Application PCT/JP01/00477 filed Jan. 25, 2001 which designated the U.S. and that International Application was not published under PCT Article 21(2) in English.

TECHNICAL FIELD

This invention relates to portable telephones that produce musical tones such as melody sound and rhythm sound to respond to incoming calls and play games.

BACKGROUND ART

Recently, portable telephones have been widely spread and used among general people, so particularly young persons frequently owned portable telephones for personal communications. Recently, the engineers have developed a variety of techniques for portable telephones, some of which provided specific functions as game devices in addition to portable telephone functions. For this reason, there is a strong demand that portable telephones be further developed and improved in function as game devices.

It is an object of the present invention to provide a portable telephone that provides brand-new functions as game devices, which realize particularly simulated performance of musical instruments.

DISCLOSURE OF INVENTION

A portable telephone of this invention is basically designed to realize game device functions, particularly music games, in addition to portable telephone functions. According to portable telephone functions, the portable telephone establishes a line connection with an external telephone terminal by radio communication in connection with the existing telephone line network constituted by base stations and mobile exchanges, for example. Herein, the portable telephone is capable of generating musical tones and rhythm sounds of a prescribed musical tune in response to reception of incoming calls. The game device functions are embodied specifically by means of a vibration device such as a vibration sensor and a vibration motor. That is, when the user swings and vibrates the portable telephone in synchronization with rhythm sounds, the vibration device produces vibration pulses, which are compared with rhythm pulses. Then, a score is marked with respect to user's operation to swing and vibrate the portable telephone on the basis of time differences detected between vibration pulses and rhythm pulses and is displayed on the screen of a display. That is, the user is capable of playing a music game by swinging and vibrating the portable telephone like a maraca in synchronization with rhythm.

Incidentally, when the vibration motor is installed in the portable telephone, it is possible to generate vibration in response to reception of incoming calls, and it is possible to detect vibration applied to the portable telephone in response to counter-electromotive force produced by the vibration motor. Herein, the counter-electromotive force can be also used to charge a battery of the portable telephone.

BEST MODE FOR CARRYING OUT THE INVENTION

This invention will be described in further detail by way of examples with reference to the accompanying drawings.

Figure 1:
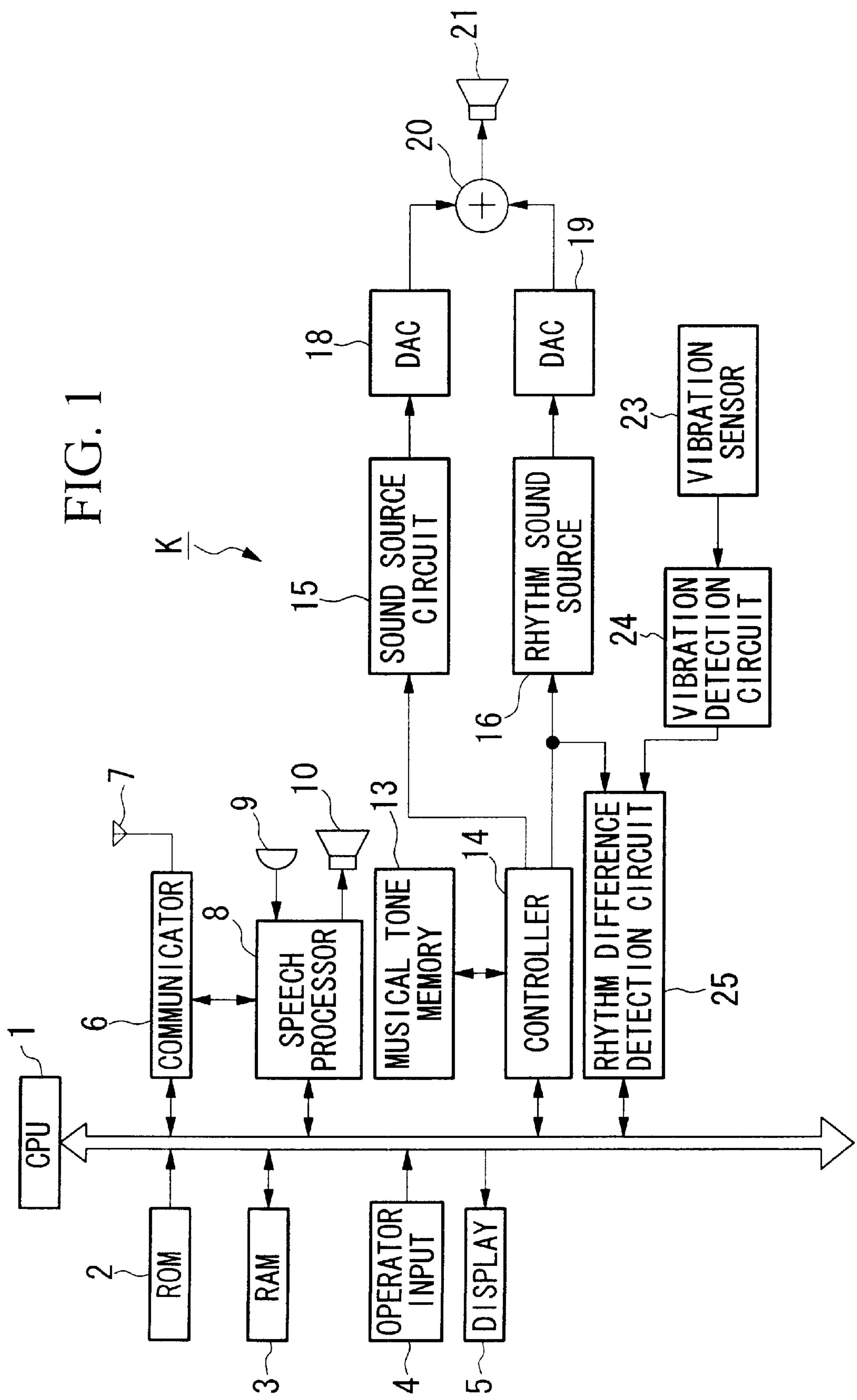
FIG. 1 is a block diagram showing an electronic configuration of a portable telephone in accordance with a first embodiment of the present invention.

FIG. 1 shows an electronic configuration of a portable telephone K in accordance with a first embodiment of the present invention. In FIG. 1, reference numeral 1 designates a central processing unit (CPU) that performs overall controls on several sections and circuits of the portable telephone K, and reference numeral 2 designates a read-only memory (ROM) that stores programs executed by the CPU 1 as well as incoming call melody data used for generation of incoming call melody sound to notify a user of the portable telephone K of reception of incoming calls from calling parties. Reference numeral 3 designates a random-access memory (RAM) that is used as a temporary storage of data. The RAM 3 temporarily stores telephone numbers for use in dial processing and music data used for playing games. Incidentally, the RAM 3 has a battery-backup. Reference numeral 4 designates an operator input section that contains numeric keys for use in entry of telephone numbers and function keys for inputting commands and instructions. Reference numeral 5 designates a display that is constituted by a liquid crystal display and a display control circuit.

Reference numeral 6 designates a communicator connected with an antenna 7. The communicator 6 transmits transmission data on carrier waves by the antenna 7, and it also demodulates incoming call signals received by the antenna 7 to produce incoming call data, which are forwarded to a speech processor 8. In addition, a microphone 9 picks up and converts the speech of the user of the portable telephone K to speech signals, which are forwarded to the speech processor 8. The speech processor 8 converts speech signals to digital data, which are then compressed to form transmission data to be supplied to the communicator 6. Further, the speech of a person who uses a telephone terminal (not shown) to communicate with the portable telephone K is received and converted to speech data by the communicator 6. Therefore, the speech processor 8 converts the speech data output from the communicator 6 to analog speech signals, which are forwarded to a speaker 10.

Reference numeral 13 designates a musical tone memory to which music data given from the CPU 1 is to be written. That is, the musical tone memory 13 stores incoming call melody data used for generation of incoming call melody sound and music data used for playing games, details of which will be described later. A controller 14 writes the music data given from the CPU 1 to the musical tone memory 13. Herein, the music data contain melody data, timing data and rhythm sound data. Thus, the controller 14 reads the melody data from the musical tone memory 13 to sequentially output them to a sound source circuit 15 in accordance with the timing data. In addition, the controller 14 generates pulse signals for designating timings of generating rhythm sounds and outputs them to a rhythm sound source 16 in accordance with the rhythm sound data.

The sound source circuit 15 is a circuitry that forms digital musical tone signals based on the FM system or PCM system. That is, the sound source circuit 15 forms digital melody sound signals based on the melody data output from the controller 14, so that the digital melody sound signals are forwarded to a digital-to-analog converter (DAC) 18. The digital-to-analog converter 18 converts the digital melody sound signals output from the sound source circuit 15 to analog melody sound signals, which are forwarded to a mixer 20. The rhythm sound source 16 generates digital rhythm sound signals based on the pulse signals output from the controller 14, so that the digital rhythm sound signals are forwarded to a digital-to-analog converter (DAC) 19. The digital-to-analog converter 19 converts the digital rhythm sound signals output from the rhythm sound source 16 to analog rhythm sound signals, which are forwarded to the mixer 20. The mixer 20 mixes together the analog melody sound signals and analog rhythm sound signals that are respectively output from the digital-to-analog converters 18 and 19. Thus, the mixer 20 produces mixed signals, which are forwarded to a speaker 21.

Reference numeral 23 designates a vibration sensor that senses swinging vibration applied to the portable telephone K by the user. When an output of the vibration sensor 23 exceeds a prescribed threshold level, a vibration detection circuit 24 generates a pulse, which is forwarded to a rhythm difference detection circuit 25. That is, as long as the output of the vibration sensor 23 exceeds the prescribed threshold level, the vibration detection circuit 24 outputs pulse signals, which are forwarded to the rhythm difference detection circuit 25. The user starts a game by pressing a certain key on the operator input section 4 so that the CPU 1 issues a game start signal, which activates the rhythm difference detection circuit 25 to operate. That is, after the CPU 1 issues the game start signal, the rhythm difference detection circuit 25 measures time differences between pulses output from the controller 14, which designate timings of generating rhythm sounds, and pulses output from the vibration detection circuit 24 which detects the swinging vibration of the portable telephone K. Then, the measured time differences are forwarded to the CPU 1.

Next, descriptions will be given with respect to detailed operations of the portable telephone K that provides game device functions in addition to portable telephone functions. First, a description will be given with respect to the portable telephone functions of the portable telephone K.

At reception of an incoming call from a telephone terminal of a calling party, the communicator 6 receives incoming call signals by the antenna 7, wherein the incoming call signals are demodulated to produce incoming call data, which are forwarded to the CPU 1. Upon receipt of the incoming call data, the CPU 1 accesses the RAM 3 to store a telephone number of the calling party. Then, the CPU 1 reads from the ROM 2 the incoming call melody data, which are forwarded to the controller 14. The controller 14 writes the incoming call melody data to the musical tone memory 13, from which the incoming call melody data are sequentially read out and supplied to the sound source circuit 15. Thus, the sound source circuit 15 generates incoming call melody signals, which are converted to analog signals by the digital-to-analog converter 18. The analog signals are supplied to the speaker 21 by way of the mixer 20, so that the speaker 21 produces incoming call melody sound.

When hearing the incoming call melody sound, the user of the portable telephone K presses a call reception button (not shown) on the operator input section 4, so that the CPU 1 issues an incoming call sound stop instruction to the controller 14. In addition, the CPU 1 issues a line connection instruction to the speech processor 8 and communicator 6. Thus, a line connection is established between the portable telephone K and the telephone terminal of the calling party. This enables transmission of speech signals of the microphone 9 to the calling party. In addition, the speech processor 8 outputs speech signals based on the speech of the calling party to the speaker 10. Thus, the speaker 10 produces the speech of the calling party.

In a call transmission mode, the user of the portable telephone K operates the numeric keys on the operator input section 4 to enter a telephone number of a called party, then, the user presses a call transmission button (not shown) on the operator input section 4. By the entry of the telephone number using the numeric keys, the CPU 1 writes the telephone number to the RAM 3. When the user presses the call transmission button, the CPU 1 sends the telephone number temporarily stored in the RAM 3 to the communicator 6. Then, the communicator 6 transmits signals representing the telephone number on carrier waves by the antenna 7. Hence, call signals corresponding the telephone number are sent to the telephone terminal of the called party. When a line connection is established with the telephone terminal of the called party, the CPU 1 issues a line connection instruction to the communicator 6 and the speech processor 8. This secures conversation with the called party by the microphone 9 and speaker 10.

The aforementioned portable telephone functions are generally employed by the conventional portable telephones.

Next, a description will be given with respect to the game device functions of the portable telephone K. In this case, the user calls a music download center (not shown) over phone to request distribution (or download) of musical tunes. The music download center corresponds to computer facilities that are provided for exclusive use in distribution of music information and data. When receiving requests from users or subscribers of telephones via telephone lines, the music download center distributes music data of requested musical tunes on charges. That is, the music download center distributes to the users or subscribers the music data containing melody sound data and rhythm sound data. When the user of the portable telephone K requests a certain musical tune for distribution, the music download center downloads corresponding music data to the portable telephone K, in which the music data are received by the communicator 6 and are forwarded to the CPU 1. The CPU 1 writes the downloaded music data to the RAM 3. Herein, the user of the portable telephone K is capable of requesting distribution of multiple musical tunes from the music download center, so that the multiple musical tunes are written to the RAM 3.

When the portable telephone K receives downloaded music data of multiple musical tunes as requested, the user is capable of selecting one of the musical tunes by operating a prescribed key (or keys) on the operator input section 4. The CPU 1 detects key operations made by the user to read out music data of the selected musical tune from the RAM 3. The read music data are forwarded to the controller 14, by which they are written to the musical tone memory 13. Then, the user operates a prescribed key to start a game on the operator input section 4. The CPU 1 detects such a key operation to issue a game start instruction to the controller 14 and the rhythm difference detection circuit 25. Thus, the controller 14 sequentially reads from the musical tone memory 13 the music data that contain melody data, timing data and rhythm sound data. The controller 14 outputs the melody data to the sound source circuit 15 in accordance with the timing data, while it also outputs pulse signals designating timings of generating rhythm sounds to the rhythm sound source 16 in accordance with the rhythm sound data. Thus, the speaker 21 produces melody sound and rhythm sound of the selected musical tune.

In synchronization with the musical tune, the user holds and swings the portable telephone K like a maraca, which is a kind of a percussion instrument. When the user swings the portable telephone K, swinging vibration is applied to the portable telephone K and is sensed by the vibration sensor 23 that output pulses. That is, the vibration detection circuit 24 outputs pulse signals corresponding to outputs of the vibration sensor 23 to the rhythm difference detection circuit 25. Hence, the rhythm difference detection circuit 25 inputs pulses output from the vibration detection circuit 24 for detecting the swinging vibration and pulses output from the controller 14 for designating timings of generating rhythm sounds. As long as the user continuously swings the portable telephone K intensely over the prescribed threshold level, the rhythm difference detection circuit 25 successively detects time differences between the aforementioned pulses. As a result, the rhythm difference detection circuit 25 produces time difference data in connection with the output pulses of the controller 14 respectively, so that the time difference data are successively forwarded to the CPU 1. The CPU 1 sequentially writes the time difference data to the RAM 3.

When the portable telephone K completes playback of the musical tune based on the music data written in the musical tone memory 13, the controller 14 issues an interrupt signal representing an end of playback to the CPU 1. Upon receipt of the interrupt signal, the CPU 1 sums up the time difference data written to the RAM 3. Thus, a total of the time difference data is displayed on the screen of the display 5 as a user's score in playing a music game.

In the aforementioned embodiment, the portable telephone K is designed to generate rhythm pulses based on rhythm data contained in music data. It is possible to modify the present embodiment such that rhythm pulses be extracted from the melody sound data. In addition, it is possible to modify the present embodiment such that generation of rhythm sounds be stopped during a game play.

Figure 2:
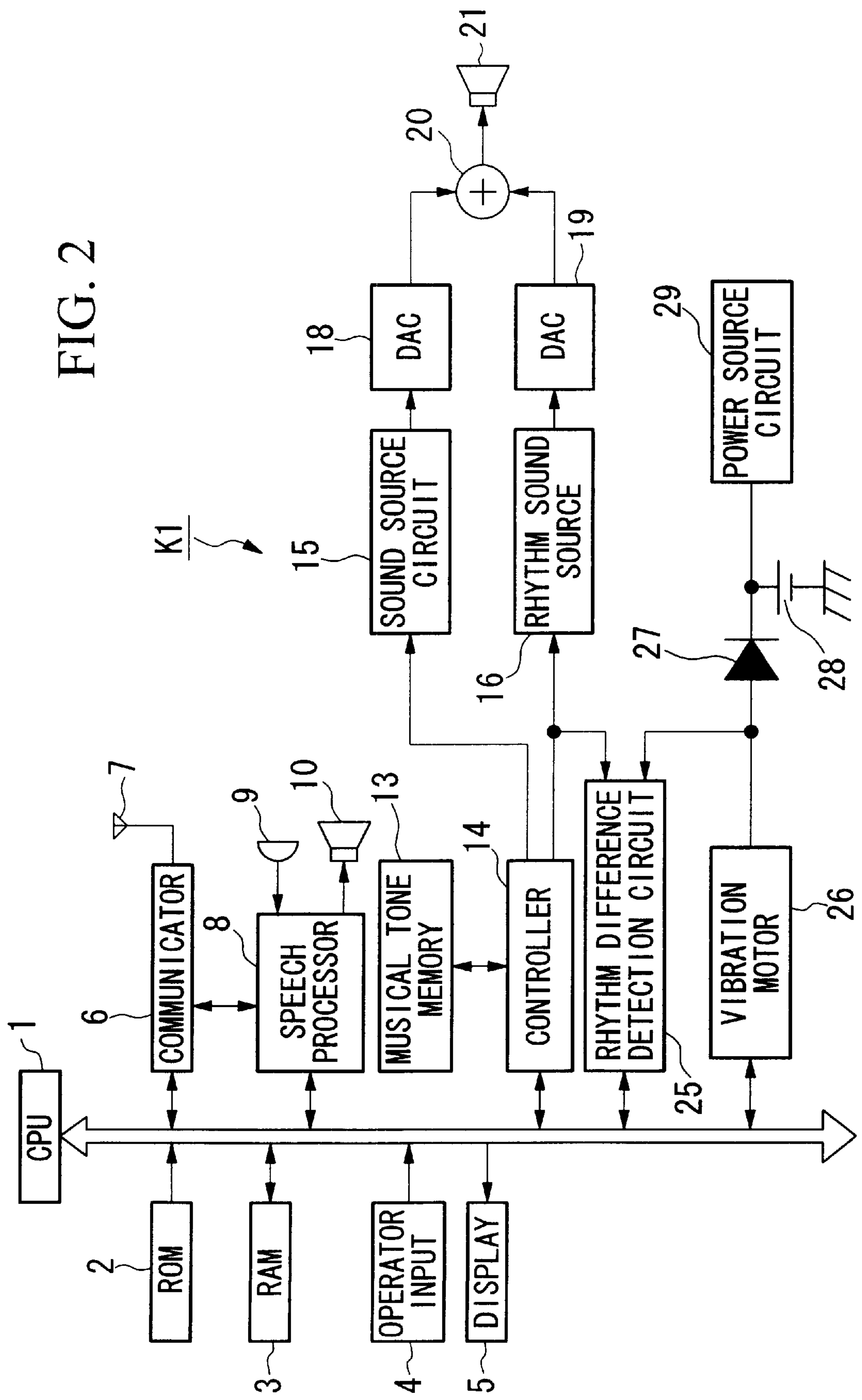
FIG. 2 is a block diagram showing an electronic configuration of a portable telephone in accordance with a second embodiment of the present invention.

Next, a second embodiment of the present invention will be described with reference to FIG. 2, which shows an electronic configuration of a portable telephone K1. In FIG. 2, parts identical to those shown in FIG. 1 are designated by the same reference numerals, hence, the description thereof will be omitted as necessary.

The portable telephone K1 shown in FIG. 2 differs from the portable telephone K1 shown in FIG. 1 by the provision of a vibration motor 26 and a diode 27, which substitute for the aforementioned vibration sensor 23 and vibration detection circuit 24. Incidentally, the portable telephone K1 shown in FIG. 2 is also equipped with a battery 28 and a power source circuit 29, which are also used by the portable telephone K of FIG. 1 wherein those elements are omitted from the illustration. The vibration motor 26 is a dc motor in which a vibrating member is fixed to a rotation shaft in an unbalanced manner. When the vibration motor 26 operates to rotate the rotation shaft, the vibrating member is subjected to unbalanced motion to cause vibration. The diode 27 is provided to prevent reverse current from flowing therethrough.

In the portable telephone K1, the user is capable of operating some key on the operator input section 4 to select vibration caused by the vibration motor 26 instead of generation of incoming call melody sound. In that case, at reception of an incoming call, the CPU 1 issues a drive instruction to the vibration motor 26. Thus, the portable telephone K1 activates the vibration motor 26 to cause vibration without generating incoming call melody sound in response to reception of an incoming call.

Next, a description will be given with respect to game device functions of the portable telephone K1. In this case, the user cuts off power supply to the vibration motor 26. Similar to the portable telephone K shown in FIG. 1, the portable telephone K1 performs similar processing so that the speaker 21 produces musical tones of a specific musical tune being selected. When the user swings and vibrates the portable telephone K1 in synchronization with the musical tones of the specific musical tune, the rotation shaft of the vibration motor 26 is forced to rotate due to vibration of the portable telephone K1. Due to the forced rotation of the rotation shaft, 'pulse-like' counter-electromotive force is caused to occur on a coil of the vibration motor 26. The counter-electromotive force is supplied to the rhythm difference detection circuit 25. Then, the rhythm difference detection circuit 25 detects time differences between the pulses of counter-electromotive force and the rhythm pulses output from the controller 14. The rhythm difference detection circuit 25 produces time difference data, which are forwarded to the CPU 1. That is, the portable telephone K1 is characterized by using the vibration motor 26 instead of the vibration sensor 23 shown in FIG. 1.

The aforementioned counter-electromotive force is supplied to the battery 28 via the diode 27, so that the battery 28 will be charged. This means that the portable telephone K1 uses the vibration motor 26 as a vibration source as well as an electricity generating source that charges the battery 28 while the user enjoys playing a music game.

As described heretofore, this invention has a variety of effects and technical features, which are described below.

(1) The portable telephone of this invention is designed to detect time differences between rhythm pulses corresponding to a rhythm of a musical tune and pulses that are produced by the user who swings and vibrates the portable telephone in synchronization with musical tones of the musical tune. In addition, the portable telephone introduces a brand-new function to automatically mark a score in a music game on the basis of the time differences between the rhythm pulses and the pulses produced in response to user's motion. Thus, it is expected that the portable telephones providing the aforementioned function may attract interests of people to arouse new demands on the market of portable telephones and game devices.

(2) Detecting vibration on the portable telephone is not only realized by a vibration sensor but also realized by a vibration motor. The vibration motor is used to cause vibration in response to reception of incoming calls from calling parties. In addition, the vibration motor can be also used as a sensor because it produces counter-electromotive force in response to vibration applied thereto. Further, the counter-electromotive force can be used to charge a battery. Thus, portable telephones that provide vibration motors to realize game device functions of this invention can be easily manufactured without providing new capital investment in the existing phone manufacturing facilities. This may bring reduction in manufacturing costs for producing new portable telephones having game device functions.

Lastly, this invention is not necessarily limited to the foregoing embodiments, hence, it is possible to provide any types of modifications within the scope of the invention without departing from essential subject matters.

What is claimed is:

1. A portable telephone having a communicator for receiving and transmitting signals with base stations by radio communication to secure conversation with an external telephone terminal, comprising:

a vibration motor for applying vibration to the portable telephone at reception of an incoming call, wherein the vibration motor generates counter-electromotive force when vibrated;

a musical tone generator for generating musical tones of a prescribed musical tune;

a rhythm sound signal generator for generating rhythm sound signals in synchronization with the musical tones of the prescribed musical tune;

a rhythm difference detector for detecting timing differences between outputs of the vibration motor corresponding to the counter-electromotive force and the rhythm sound signals;

a scorer for marking a score based on the timing differences detected by the rhythm difference detector; and a display for displaying the score on a screen thereof.

2. A portable telephone according to claim 1, wherein the vibration device corresponds to a vibration motor that generates pulses of counter-electromotive force when vibrated.

3. A portable telephone according to claim 1, wherein a battery is automatically charged by the counter-electromotive force produced by the vibration motor.

4. A portable communication terminal device for receiving and transmitting signals with base stations by radio communication to secure data communication with an external communication terminal, comprising:

a vibration motor for in a data reception mode, applying vibration to the portable communication terminal device, and for in a non-data reception mode, generating counter-electromotive force when vibration is applied thereto from an exterior;

a musical tone generator for generating musical tone signals of a prescribed musical tune;

a rhythm sound signal generator for generating prescribed rhythm sound signals in response to the musical tone signals of the prescribed musical tune;

a rhythm difference detector for detecting timing differences between output signals of the vibration motor corresponding to the counter-electromotive force and the rhythm sound signals from the rhythm sound signal generator;

a scorer for marking a score based on the timing differences detected by the rhythm difference detector; and a display for displaying a marking result of the scorer on a screen.

5. A portable communication terminal device according to claim 4 further comprising a speaker for performing electroacoustic conversion on the musical tone signals from the musical tone generator, thus reproducing musical tones.

* * * * *